United States Patent
Baumann et al.

(10) Patent No.: US 11,725,695 B2
(45) Date of Patent: Aug. 15, 2023

(54) BEARING HOUSING

(71) Applicant: AKTIEBOLAGET SKF, Gothenburg (SE)

(72) Inventors: Michael Baumann, Gädheim (DE); Matthias Hofmann, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/539,306

(22) Filed: Dec. 1, 2021

(65) Prior Publication Data

US 2022/0178402 A1 Jun. 9, 2022

(30) Foreign Application Priority Data

Dec. 8, 2020 (DE) .......................... 102020132672.6

(51) Int. Cl.
*F16C 35/04* (2006.01)
*F16C 19/54* (2006.01)
(Continued)

(52) U.S. Cl.
CPC ............ *F16C 35/042* (2013.01); *F03D 80/70* (2016.05); *F16C 19/548* (2013.01); *F16C 39/02* (2013.01);
(Continued)

(58) Field of Classification Search
CPC .... F16C 19/548; F16C 35/042; F16C 35/045; F16C 35/067; F16C 35/077; F16C 39/02;
(Continued)

(56) References Cited

U.S. PATENT DOCUMENTS

2008/0272604 A1* 11/2008 Versteegh ............. F03D 1/0666
416/174
2010/0019502 A1* 1/2010 Pabst ...................... F03D 80/50
290/55
(Continued)

FOREIGN PATENT DOCUMENTS

DE    202012011274 U1    2/2014
EP       2273112 A2      1/2011
(Continued)

OTHER PUBLICATIONS

Written Opinion and Search Report from the European Patent Office dated Apr. 8, 2022, in related application No. EP 21 212 265.9, and translation thereof.

*Primary Examiner* — Alan B Waits
(74) *Attorney, Agent, or Firm* — J-Tek Law PLLC; Scott T. Wakeman; Mark A. Ussai

(57) ABSTRACT

A bearing housing is configured as an end-side cover for a nacelle of a fluid-flow power plant and includes a cylindrical section having an interior and a bearing unit in the interior. The bearing unit includes at least one rolling-element bearing having an inner ring and an outer ring rotatably disposed with respect to each other about a bearing rotational axis and a plurality of rolling elements between the rings. A pressure line of the bearing intersects the bearing rotational axis at a first angle. An angled section of the housing extends from the cylindrical section of the housing at a second angle that is related to, and preferably substantially equal to, the first angle.

15 Claims, 1 Drawing Sheet

(51) Int. Cl.
*F03D 80/70* (2016.01)
*F16C 39/02* (2006.01)
(52) U.S. Cl.
CPC ...... *F16C 2360/00* (2013.01); *F16C 2360/31* (2013.01)
(58) Field of Classification Search
CPC .. F16C 2360/00; F16C 2360/31; F03D 80/70; Y02E 10/72; Y02E 10/727; Y02E 10/728; F05B 2240/52; F05B 2240/50
See application file for complete search history.

(56) References Cited

U.S. PATENT DOCUMENTS

| | | | |
|---|---|---|---|
| 2010/0329867 A1* | 12/2010 | Patel | F03D 15/00 416/169 R |
| 2011/0142598 A1* | 6/2011 | Andersen | F03D 80/70 415/122.1 |
| 2015/0030277 A1 | 1/2015 | Pick et al. | |
| 2017/0089319 A1* | 3/2017 | Hofmann | F03B 17/061 |

FOREIGN PATENT DOCUMENTS

| | | |
|---|---|---|
| EP | 2372145 A1 | 10/2011 |
| WO | 2013152850 A1 | 10/2013 |
| WO | 2013185768 A1 | 12/2013 |

* cited by examiner

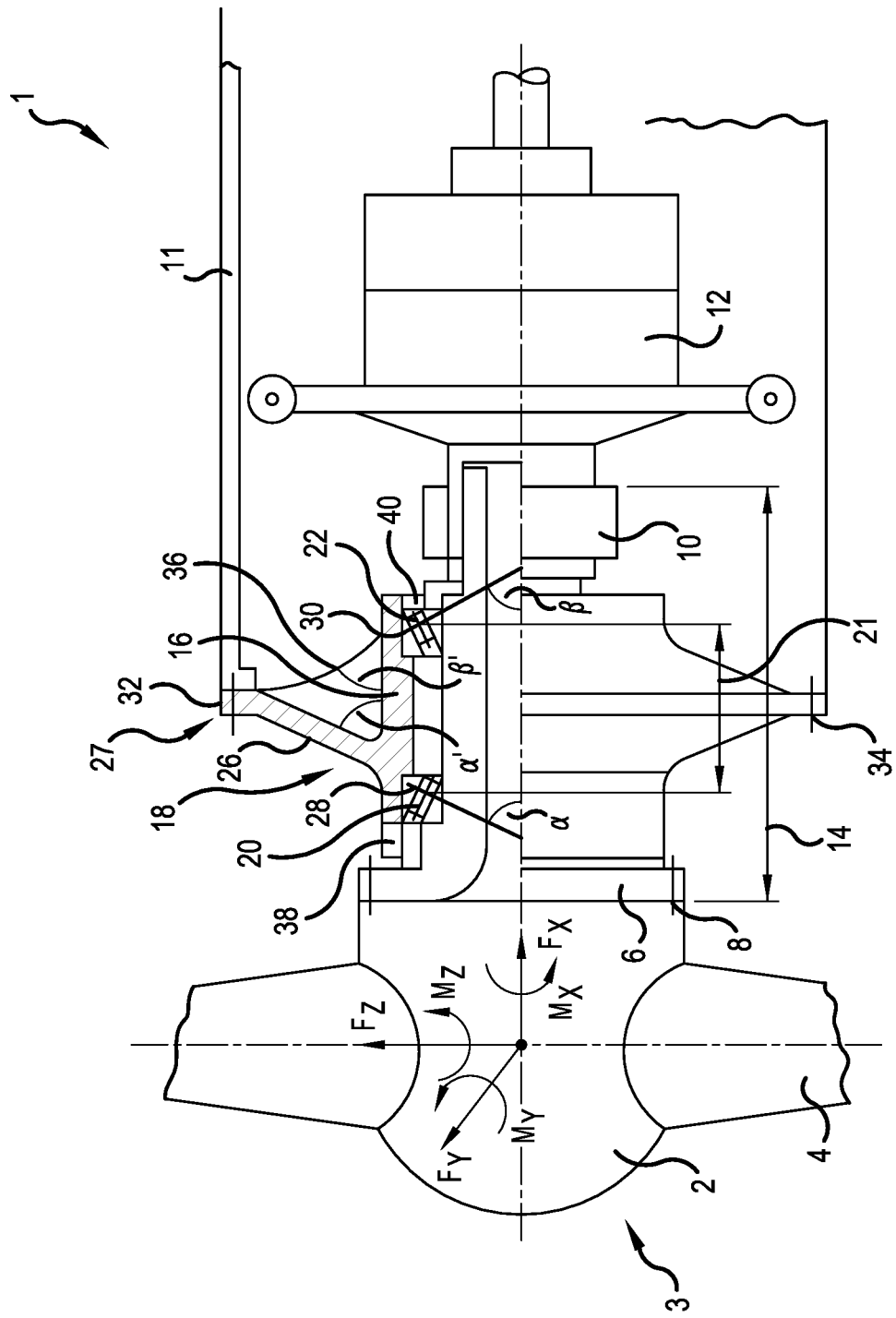

BEARING HOUSING

CROSS-REFERENCE

This application claims priority to German patent application no. 10 2020 132 672.6 filed on Dec. 8, 2020, the contents of which are fully incorporated herein by reference.

TECHNOLOGICAL FIELD

The present invention relates to a bearing housing configured as an end-side cover for a nacelle of a fluid-flow power plant.

BACKGROUND

Fluid-flow power plants, such as, for example, wind turbines, tidal power plants, and marine current power plants, comprise a rotor and a nacelle. The rotor includes a blade hub and rotor blades and the nacelle houses, among other things, a rotor shaft and a generator. The rotor shaft is driven by rotation of the rotor, and the generator is driven by rotation of the rotor shaft and generates electricity. The rotor itself is driven by the flow of the fluid, which can be air or water.

Due to the flow of the fluid, forces and bending moments act on the rotor blades, which transmit them via the rotating blade hub onto the rotor shaft and its bearing assembly. Depending on the flow speed and direction of the fluid, strong forces can be transmitted from the blade hub and the rotor blades onto the rotor shaft. It is therefore necessary to dissipate these resulting bearing forces onto carrying structures, such as, for example, the nacelle, since only the rotating drive torque of the rotor shaft for the downstream gearbox and the generator is to be used for the generating of energy.

SUMMARY

It is therefore an aspect of the present disclosure to provide a bearing housing that provides an optimized dissipation of force and bending moments into a carrying structure.

In the following a bearing housing is disclosed that is configured in particular as an end-side cover for a nacelle of a fluid-flow power plant. The housing has a cylindrical section that is configured to receive a bearing unit that includes at least one rolling-element bearing. Here the rolling-element bearing has an inner ring and an outer ring that are disposed rotatably with respect to each other about a bearing rotational axis. The rings form a rolling space in which a plurality of rolling elements are disposed. The rolling elements can also be received in a cage that guides them spaced from one another.

In order to improve a continuous dissipation of the forces or bending moments transmitted by a rotor and its rotor blades onto the bearing housing, the bearing housing furthermore includes a section extending at an angle with respect to the cylindrical section. The angled section is furthermore preferably configured to be connected to the nacelle of the fluid-flow power plant. In order to provide an optimized force dissipation, in particular toward the nacelle, the angle of the angled section is based on an angle between the bearing rotational axis and a pressure line of the rolling-element bearing such that a force dissipation in the direction of the pressure line of the rolling-element bearing is made possible. A direct force dissipation of the forces received from the rolling-element bearing in the direction of the pressure line in the angularly extending section, and thus into the nacelle connectable to the bearing housing, can thus be effected. In the case of a cylindrical or tapered rolling-element bearing, the pressure line may be a line perpendicular to the axis of rotation of the rolling elements of the rolling-element bearing or a line perpendicular to the outer raceway of the rolling-element bearing. The angle of the angled section may be measured relative to an inner or outer wall of the angled section or relative to an axial centerline of the angled section.

It is advantageous when the contours of the bearing housing that can come into contact with the fluid, such as, for example, air or water, have a shape that is fluidically optimized. It is also advantageous to provide seals that on the one hand prevent lubricating grease from escaping from the bearing housing and on the other hand prevent the fluid from penetrating into the nacelle via the bearing housing. Furthermore, the at least one rolling-element bearing can be configured to support a shaft, in particular a rotor shaft, where the shaft is connected at a first axial end to a hub, in particular a blade hub, and at least one rotor blade, and at a second axial end, which opposes a first axial end, to a transmission.

An angle between the angularly extending section and the cylindrical section is preferably substantially equal to the angle between the pressure line of the rolling-element bearing and the bearing rotational axis. The term "substantially equal" is understood in particular to mean that the angles differ by less than 5° degrees. A force dissipation into the section extending angularly with respect to the cylindrical section can thereby be optimized, and the force dissipation into the cylindrical section can be reduced.

According to one embodiment, the angularly extending section extends radially outward into an extension of the pressure line of the rolling-element bearing. In other words, the angularly extending section extends the pressure line radially outward, so that the force and bending-moment dissipation can be effected directly into the angularly extending section whereby the force and bending-moment dissipation is directed outward and thus into the nacelle connectable to the bearing housing.

According to a further embodiment, the bearing unit comprises a second rolling-element bearing that has an inner ring and an outer ring that are disposed rotatably with respect to each other about a bearing rotational axis. As in the first rolling-element bearing, a plurality of rolling elements are disposed between the inner ring and the outer ring. Due to the second rolling-element bearing, the rotor shaft is statically determinate and improves the radial and axial supporting. Here the second rolling-element bearing is disposed such that its pressure line and the pressure line of the first rolling-element bearing approximately intersect radially outward. The two rolling-element bearings are disposed in an O-arrangement arrangement with a large support width distance along the symmetry line of the rotor shaft. This is advantageous in particular with respect to the tilting stiffness.

The first and/or the second rolling-element bearing is advantageously a tapered roller bearing. Tapered roller bearings can in particular support high radial and simultaneously axial loads. When the rotational direction of the rotor reverses, for example, when a fluid-flow direction changes so that the acting forces also reverse, tapered roller bearings in an O-arrangement can in particular be advantageous since they can equally support the forces from both sides. Alternatively, angular contact ball bearings and axial spherical roller bearings can be used in a comparable O-arrangement. Depending on the flowing medium or fluid, and thus depending on the radial and axial bearing load, there is a range of low-angle or steep-angle rolling-element bearings that can be used and that determine the conical contour of the end-side bearing housing. A low-angle or steep-angle rolling-element bearing is understood in particular to be a rolling-element bearing having an angle of smaller than 30°, preferably between 12° and 28°.

The bearing spacing is preferably chosen such that an optimal tilting stiffness is achieved, wherein a thermal longitudinal expansion of the rotor shaft and a thermal bearing expansion in the radial bearing direction are preferably considered individually in order to avoid the risk of a preload increase of the bearing assembly during operation, which can lead, for example, to a hot-running of the bearing, or a preload loss, wherein, for example, the force is distributed onto a small number of the rolling elements, whereby the bearing service life can be shortened.

The angularly extending section preferably extends up to the intersection point of the pressure lines of the two rolling-element bearings. In particular, a better force dissipation can thereby be achieved, since the forces of both rolling-element bearings that need to be dissipated can thus be dissipated together toward the nacelle.

The high radial forces and bending moments can produce a deformation and a material loading of the end side bearing housing. Likewise it can be necessary to provide circumferential, and ideally uniform, support against the bearing outer rings of the rolling-element bearings in order to avoid an ovalization of the bearing outer rings and to ensure a circumferentially uniform loading of the rolling elements. For this purpose, according to a further embodiment, a plurality of stiffening ribs are provided that each connect a free end of the angularly extending section, which free end faces away from the cylindrical section, and the cylindrical section. The angularly extending section can thereby be supported against the cylindrical section. For example, the stiffening ribs can be configured encircling and be located on the inner or outer side of the bearing housing. Due to the medium or fluid flowing past against the outer side with corresponding flow behaviors, and for visual reasons, the stiffening ribs are preferably provided on the inside.

An angle between the cylindrical section and a stiffening rib is preferably related to an angle between the bearing rotational axis and the pressure line of the second rolling-element bearing so that a force dissipation in the direction of the pressure line of the second rolling-element bearing is made possible.

Furthermore, the number of stiffening ribs is advantageously an even number—preferably between 8 and 16 stiffening ribs can be provided. Alternatively an odd number of stiffening ribs can also be chosen, such as, for example, 9 or 15. It is particularly advantageous when the same number of stiffening ribs is provided in each quadrant. The plurality of stiffening ribs are preferably evenly distributed circumferentially in order to achieve a uniform force dissipation. Furthermore, the stiffening ribs can be formed from struts or from flat segments, for example, in an essentially triangular shape. In order to improve the stability of the stiffening ribs and increase their stiffness, at least one of the plurality of stiffening ribs can be additionally stiffened. This can be effected, for example, via additional stiffening elements.

To the extent possible, in order to not load the stiffening ribs in a pointwise manner, but rather along their entire length, the plurality of stiffening ribs are preferably curved, in particular curved concavely. An elliptical curvature is particularly preferable here. The optimal shape of the stiffening ribs can be determined, for example, via a finite element simulation. The curvature also permits a force directed in the direction of the pressure line of the second bearing unit to be guided and redirected along the curvature such that the force is dissipated at the transition to the angled section toward the nacelle connectable to the bearing housing. Both forces acting on the bearing can thereby be dissipated toward the nacelle.

In order to connect the bearing housing to the nacelle or another component supporting the forces of the main-shaft bearing assembly, the angularly extending section advantageously includes a flange on its free end. The flange is particularly advantageously disposed in the region of the intersection point of the pressure lines of the two rolling-element bearings. The forces and moments can thereby be dissipated via the flange onto the nacelle or the component, whereby a uniformly constant, i.e., straight and uninterrupted, force flow onto the nacelle or the component is made possible. The flange can include a bolt-hole circle via which the bearing housing can be screwed to the component. A diameter of the bearing housing, and in particular of the flange, is preferably larger than a diameter of the installed transmission or generator that is connected to the shaft, so that the bearing housing can be preinstalled together with the shaft and the transmission, and can be installed together on the component. Installation can thereby be simplified.

Furthermore, the angle between the pressure line of the first rolling-element bearing and the bearing rotational axis, and an angle between the pressure line of the second rolling-element bearing and the bearing rotational axis, can be different from each other. That is, the pressure lines can extend with different steepness with respect to the bearing rotational axis. In particular the force dissipation can thereby be adapted to the expected forces. Alternatively the two angles are identical to each other. In particular the forces acting on the rolling-element bearing can thereby be uniformly distributed.

Furthermore, a nacelle is disclosed for a fluid-flow power plant, which nacelle includes a cover, wherein the cover is configured as a bearing housing as described above.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 1 is a partial sectional view through a fluid-flow power plant including a bearing housing according to one embodiment of the present disclosure.

DETAILED DESCRIPTION

In the following, identical or functionally equivalent elements are designated by the same reference numbers.

FIG. 1 shows a partial section through a fluid-flow power plant 1. The fluid-flow power plant 1 comprises a rotor 3 including a blade hub 2 on which a plurality of rotor blades 4 are disposed. Due to a flow of a fluid, such as, for example, water or air, the blade hub 2 is set into rotation via the rotor blades 4, wherein the rotation is transmitted to a rotor shaft 6. Forces $F_x$, $F_y$, $F_z$ which result from the flow of fluid against the rotor blades 4, blade bending moments $M_y$, $M_z$, and the drive moment $M_x$, are transmitted via the blade hub 2 onto the rotor shaft 6 and its bearing assembly.

The rotor shaft 6 can be attached, for example, via a screw connection 8 to the blade hub 2. On the end of the rotor shaft 6 opposite the blade hub 2, the rotor shaft 6 is coupled via a shaft coupling 10 to a transmission 12, which is in turn connected to a generator (not shown). Here the shaft coupling 10 produces the fixed connection between the rotor shaft 6 and the transmission 12. Furthermore, the fluid-flow power plant 1 has a nacelle 11, in which the rotor shaft 6, the shaft coupling 10, the transmission 12, and also the generator are received.

In order to cover an opening in the nacelle 11 and simultaneously form a cover for the bearing assembly of the rotor shaft 6, a bearing housing 14 is provided that includes a cylindrical section 16. The cylindrical section 16 is configured to carry a bearing unit 18 that includes a first rolling-element bearing 20 and a second rolling-element bearing 22. Each of the rolling-element bearings 20, 22 includes an inner ring and an outer ring that are rotatably disposed with respect to each other about a bearing rotational axis 24 and that define a rolling space between them in which a plurality of rolling elements are disposed. In the exemplary embodiment depicted in FIG. 1, the rolling-element bearings are tapered roller bearings, and the rolling elements are tapered rollers. Tapered roller bearings are highly loadable both in both the axial and radial direction and are therefore well-suited for a use in the shaft bearing assembly of the rotor. Of course, other bearing types, such as, for example, angular contact ball bearings or axial spherical roller bearings can also be used in combination with an additional radial bearing.

The first rolling-element bearing 20 is disposed on an end of the cylindrical section 16 facing the blade hub 2, such that its pressure line 28 defines an angle $\alpha$ with the bearing rotational axis. On the end of the cylindrical section 16 facing away from the blade hub 2, the second rolling-element bearing 22 is disposed at a spacing 21 from the first rolling-element bearing 20, and the pressure line 30 of the second bearing defines an angle $\beta$ with the bearing rotational axis 24. Here the two rolling-element bearings 20, 22 are disposed such that the pressure line 28 of the first rolling-element bearing 20 and the pressure line 30 of the second rolling-element bearing intersect radially outwardly of the two rolling-element bearings 20, 22. The angles $\alpha$ and $\beta$ are identical to each other in value in the exemplary embodiment shown in FIG. 1.

The bearing housing 14 furthermore has an angularly extending section 26. Here the angle $\alpha'$ between the angularly extending section 26 and the cylindrical section 16 essentially corresponds to the angle $\alpha$ between the bearing rotational axis 24 and the pressure line 28 of the first rolling-element bearing 20. The angularly extending section 26 thereby extends radially outward along the pressure line 28 of the first rolling-element bearing 20.

On the side of the angularly extending section 26 facing away from the blade hub 2, a plurality of stiffening ribs 36 are provided that connect a free end 27 of the angularly extending section 26 and the cylindrical section 16. The plurality of stiffening ribs 36 are elliptically curved so that the stiffening ribs 36 are loaded over their entire length, and not only pointwise. Furthermore, each of the stiffening ribs 36 forms an angle $\beta'$ with the cylindrical section 16 that essentially corresponds to the angle $\beta$ between the pressure line 30 of the second bearing 22 and the bearing rotational axis 24.

The curvature also allows a certain force dissipation to be effected so that a force acting toward the second pressure line can also be diverted toward the nacelle and introduced into the nacelle.

As can be seen in FIG. 1, the angularly extending section 26 extends up to the intersection point of the pressure lines 28, 30 of the two rolling-element bearings 20, 22. In the region of the intersection point of the pressure lines 28, 30 of the two rolling-element bearings 20, 22, the angularly extending section 26 is provided with a flange 32, by which the bearing housing 14 is connected to the nacelle 11 using a screw connection 34. The acting forces and moments can thereby be dissipated via the flange 32 onto the nacelle 11.

Furthermore, seals 38, 40 are provided on the side of the cylindrical section 16 facing the rotor 3 and on the side of the cylindrical section facing the nacelle 11, which seals seal the bearing housing outwardly and toward the nacelle 11.

In summary, providing a bearing housing 14 that has a section 26 extending angularly with respect to a cylindrical section 16 allows a steady flow of force to be directed to the nacelle 11 of the turbine. For this purpose an angle $\alpha'$ of the angular section 26 is related to the angle $\alpha$ between the bearing rotational axis 24 and the pressure line 28 of the rolling-element bearing 20. Force is thereby dissipated in the direction of the pressure line 28 of the rolling-element bearing 20 and can be introduced via the flange 32 into the screw connection 34 to the housing 11. In addition, the force dissipation can be improved by providing stiffening ribs 36, whose angle $\beta'$ with respect to the cylindrical section 16 is related to the angle $\beta$ between the pressure line 30 of the second rolling-element bearing 22 and the bearing rotational axis 24. These stiffening ribs on the one hand support the angular section 26, and simultaneously allow a dissipation of the forces acting on the second rolling-element bearing toward the nacelle. For this purpose the stiffening ribs are preferably curved concavely, wherein the curvature is configured in particular elliptical.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing housings for fluid power plants.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Fluid-flow power plant
2 Blade hub
3 Rotor
4 Rotor blade
6 Rotor shaft
8 Screw connection
10 Shaft coupling
11 Nacelle
12 Transmission
14 Bearing housing
16 Cylindrical section
18 Bearing unit
20, 22 Rolling-element bearing
21 Bearing spacing
24 Bearing rotational axis
26 Angled section
27 Free end of the angled section
28, 30 Pressure line
32 Flange
34 Screw connection
36 Stiffening ribs
38, 40 Seal
$\alpha$, $\alpha'$, $\beta$, $\beta'$ Angles
$F_x$, $F_y$, $F_z$ Forces
$M_x$, $M_y$, $M_z$ Bending moments

What is claimed is:

1. A bearing assembly for a fluid-flow power plant, the fluid power plant having a nacelle with an open end and a rotor shaft extending through the open end, the bearing assembly comprising:
a housing disposed about the rotor shaft and configured to entirely enclose the space between the rotor shaft and the open end of the nacelle from an exterior environment, the housing including a cylindrical section having an interior, and an angled section extending radially outwardly from the cylindrical section at an angle;
a bearing unit disposed in the interior of the cylindrical section of the housing, the bearing unit including a first rolling-element bearing having an inner ring and an outer ring rotatably disposed with respect to each other about a bearing rotational axis and defining a rolling space between them, and a first plurality of rolling elements disposed in the rolling space, a pressure line of the first bearing intersecting the bearing rotational axis at a first angle substantially equal to the angle of the angled section of the housing such that the pressure line extends through the angled section.

2. The bearing assembly according to claim 1,
wherein the angled section has a first end at the cylindrical section and a second end spaced from the first end, and a flange attached to the second end, and
wherein the pressure line of the first bearing extends through the first end and the second end.

3. The bearing assembly according to claim 1,
wherein the pressure line of the first bearing is parallel to an outer surface of the angled section or is parallel to an inner surface of the angled section or is parallel to an axial centerline of the angled section.

4. The bearing assembly according to claim 1,
wherein the bearing unit includes a second rolling-element bearing, the second rolling-element bearing including an inner ring and an outer ring that are disposed rotatably with respect to each other about the bearing rotational axis and define a second rolling space between them, and a second plurality of rolling elements in the second rolling space, a pressure line of the second bearing intersecting the bearing rotational axis at an angle, and
wherein the second rolling-element bearing is disposed within the housing such that the pressure line of the second bearing intersects the pressure line of the first bearing at a location radially outward of the cylindrical section of the housing.

5. The bearing assembly according to claim 4,
wherein the angled section of the housing has a first end at the cylindrical section and a second end spaced from the first end, and a flange attached to the second end, and
wherein the angled section extends from the cylindrical section to the location.

6. The bearing assembly according to claim 4,
wherein the angled section of the housing has a first end at the cylindrical section and a second end spaced from the first end, and
wherein a plurality of stiffening ribs extend from the cylindrical section to the second end of the angled section.

7. The bearing assembly according to claim 6, wherein an angle between the cylindrical section and one of the plurality of stiffening ribs is substantially equal to an angle between the bearing rotational axis and the pressure line of the second bearing.

8. The bearing assembly according to claim 6, wherein an angle between the cylindrical section and one of the plurality of stiffening ribs is based on an angle between the bearing rotational axis and the pressure line of the second bearing.

9. The bearing assembly according to claim 8, wherein each of the plurality of stiffening ribs has a concave edge.

10. The bearing assembly according to claim 8, wherein each of the plurality of stiffening ribs has an elliptically concave edge.

11. A nacelle for a fluid-flow power plant comprising:
a nacelle housing having a circular end opening, and
the bearing assembly according to claim 1 mounted at the end opening to close the opening;
wherein the angled section has a first end at the cylindrical section and a second end connected to the circular opening of the nacelle housing.

12. The bearing assembly according to claim 1, wherein the bearing housing has diameter greater than an outer diameter of a generator and/or a transmission connected to the rotor shaft such that the housing, the rotor shaft and the generator and/or the transmission is installable within the nacelle as a single assembly.

13. A bearing assembly for a fluid-flow power plant, the fluid power plant having a nacelle with an open end and a rotor shaft extending through the open end, the bearing housing assembly comprising:
a housing including a cylindrical section having an interior;
a bearing unit in the interior, the bearing unit including a first rolling-element bearing having an inner ring and an outer ring rotatably disposed with respect to each other about a bearing rotational axis and defining a rolling space therebetween, and a first plurality of rolling elements disposed in the rolling space, a pressure line of the first bearing intersecting the bearing rotational axis at a first angle, and an angled section extending radially outward from the cylindrical section at a second angle, the first angle being substantially equal to the second angle, wherein the bearing unit includes a second rolling-element bearing, the second rolling-element bearing including an inner ring and an outer ring that are disposed rotatably with respect to each other about the bearing rotational axis and define a second rolling space therebetween, and a second plurality of rolling elements in the second rolling space, a pressure line of the second bearing intersecting the bearing rotational axis at an angle, the second rolling-element bearing being disposed such that the pressure line of the second bearing intersects the pressure line of the first bearing at a location radially outward of the cylindrical section, and wherein the angled section has a first end at the cylindrical section and a second end spaced from the first end, and a flange attached to the second end, and the angled section extends from the cylindrical section to the location.

14. A bearing assembly for a fluid-flow power plant, the fluid power plant having a nacelle with an open end and a rotor shaft extending through the open end, the bearing housing assembly comprising:

a housing including a cylindrical section having an interior;

a bearing unit in the interior, the bearing unit including a first rolling-element bearing having an inner ring and an outer ring rotatably disposed with respect to each other about a bearing rotational axis and defining a rolling space therebetween, and a first plurality of rolling elements disposed in the rolling space, a pressure line of the first bearing intersecting the bearing rotational axis at a first angle, and an angled section extending radially outward from the cylindrical section at a second angle, the first angle being substantially equal to the second angle, wherein the angled section has a first end at the cylindrical section and a second end spaced from the first end, and a plurality of stiffening ribs extending from the cylindrical section to the second end of the angled section, an angle between the cylindrical section and one of the plurality of stiffening ribs is substantially equal to an angle between the bearing rotational axis and the pressure line of the second bearing.

15. A bearing assembly for a fluid-flow power plant, the fluid power plant having a nacelle with an open end and a rotor shaft extending through the open end, the bearing housing assembly comprising:

a housing including a cylindrical section having an interior;

a bearing unit in the interior, the bearing unit including a first rolling-element bearing having an inner ring and an outer ring rotatably disposed with respect to each other about a bearing rotational axis and defining a rolling space therebetween, and a first plurality of rolling elements disposed in the rolling space, a pressure line of the first bearing intersecting the bearing rotational axis at a first angle, and an angled section extending radially outward from the cylindrical section at a second angle, the first angle being substantially equal to the second angle, wherein the angled section has a first end at the cylindrical section and a second end spaced from the first end, and a plurality of stiffening ribs extending from the cylindrical section to the second end of the angled section, an angle between the cylindrical section and a line passing through the radial inner end and the radial outer end of one of the plurality of stiffening ribs is substantially equal to an angle between the bearing rotational axis and the pressure line of the second bearing and each of the plurality of stiffening ribs having a concave edge or an elliptically concave edge.

* * * * *